N. HODGE.
Velocipede.
No. 9,054. Patented June 22, 1852.
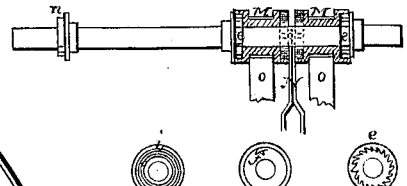
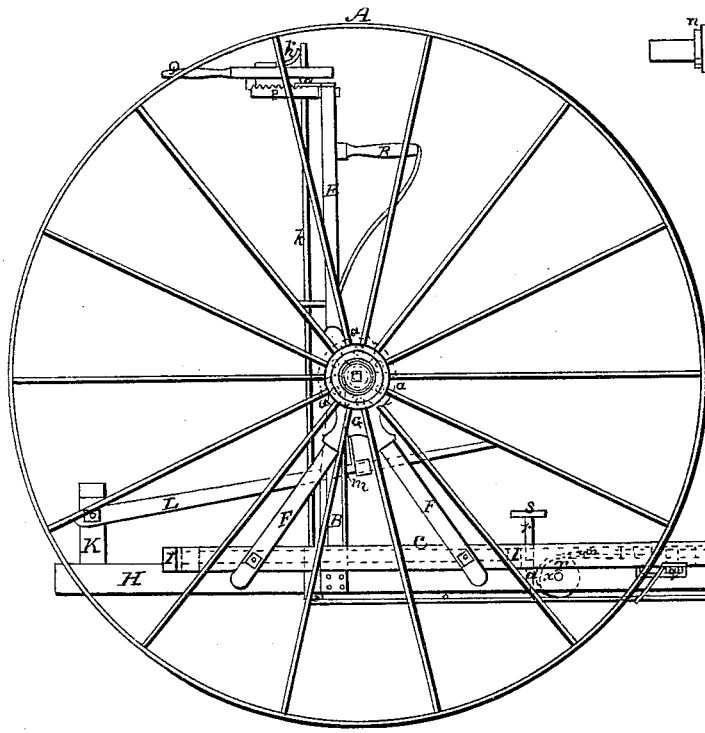
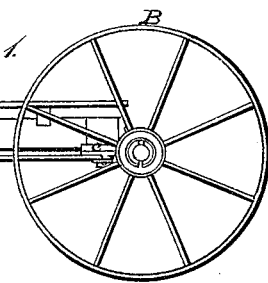
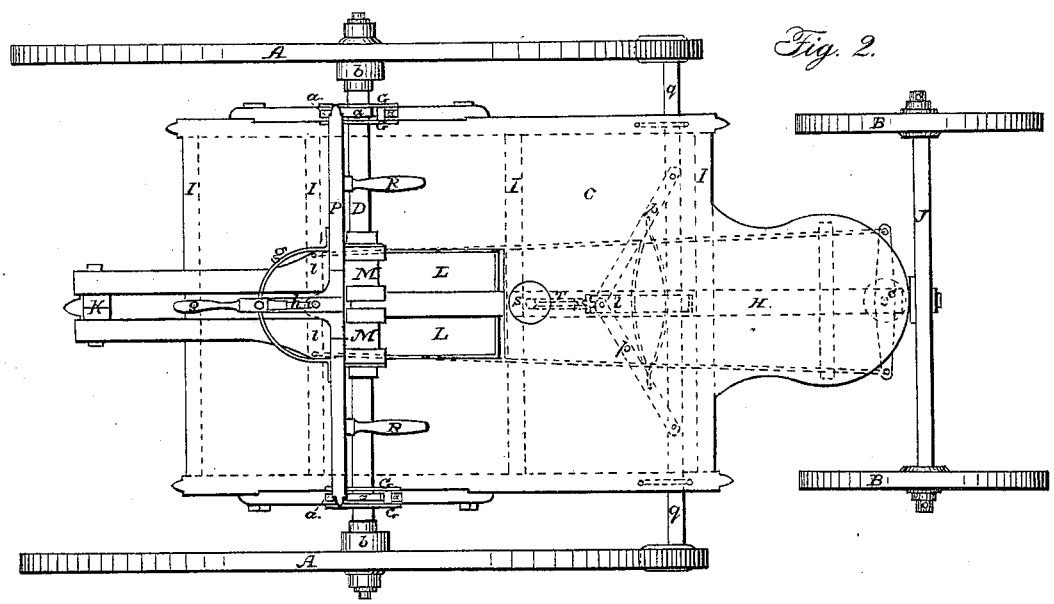

UNITED STATES PATENT OFFICE.

NEHEMIAH HODGE, OF NORTH ADAMS, MASSACHUSETTS.

FOOT-CAR.

Specification of Letters Patent No. 9,054, dated June 22, 1852.

*To all whom it may concern:*

Be it known that I, NEHEMIAH HODGE, of North Adams, in the county of Berkshire and State of Massachusetts, have invented certain new and useful Improvements in Foot-Cars; and I do hereby declare the following to be a full, clear, and exact description of the same, reference being had to the accompanying drawings, making a part thereof, in which—

Figure 1 represents a side view. Fig. 2 represents a top view. Fig. 3 represents a portion of the axle, with the moving parts thereon represented in section, and Fig. 4 represents detached portions of car, and which cannot be fully shown in the other figures.

Similar letters in the several figures represent the same parts.

The nature of my invention consists in suspending the weight of the passenger upon one side of the axle, on levers of equal length, which are so arranged as to rotate the said axle, whether they be applied both together, or one at a time alternately, and through said axle give motion to the driving wheels, and also combining with the axles and driving wheels the ratchet wheels, and spring pawls, for the purpose of allowing the driving wheels a continuous motion in one direction, while the axle may have an intermittent motion or rotation in the same direction.

To enable others skilled in the art to make and use my invention, I will proceed to describe the same with reference to the drawings.

A, represents the driving wheels, and B, the guiding and supporting wheels.

The platform C, is suspended from the axle D, by means of the upright E, and braces F, which are firmly secured to each other by two metallic plates G, between which are placed a series of friction wheels *a*, which form a bearing or box for the axle D, which passes through said plates G, to turn in—both sides of the platform being suspended and arranged in the same manner. Underneath the center of the platform longitudinally passes a beam H, to which are firmly attached the cross pieces I, on which the platform or bed of the car is built or laid. On the rear end of this beam H (the large or driving wheels being placed in front of the car, or that end of it which always goes foremost) is attached a stationary circular plate *c*, to which is attached, by a pin on which it may freely turn, a similar plate or "fifth wheel" attached to the axle J, which is supported in the guiding wheels B, so as to allow the axle J, to be turned easily in any direction by the operator, for guiding the car, by means to be hereafter described.

On the front end of the beam H, is arranged an upright K, to which is hinged the two levers L, L, which project rearward sufficiently far to allow the operator to stand in rear of the axle. Immediately over these levers L, L, on the axle D, are arranged two drums M, M, the flanges on which next the wheels, cover two ratchets *e*, which are permanently fixed on the axle D, and on the inside of these flanges on the said drums are placed spring pawls or clicks *f*, Fig. 4, which catch into said ratchets, when the drums revolve, and turn the axle. In the inside flanges of these drums M, M, is a coiled steel spring *i*, one end of which is fastened to the drum, and the other end to a stationary upright N, secured to the platform, the object of these springs being to raise up the levers after they have been pressed down by the weight of the operator. The levers L, L, are attached to these drums M, M, by means of straps or bands O, or any other similarly yielding material, which may be easily wound on and off said drums. The springs *i*, should be tightly strained up before the strap or band O, is attached, so as to insure always the bringing up of the levers against their stop *m*, when the foot of the operator is removed from said lever. The heels *b*, of the hubs of the driving wheels, also cover ratchets *n*, firmly fixed on the axle D; and inside of the hubs are spring pawls or clicks *d*, which catch into said ratchets, so that when the axle is rotated the ratchets *n* thereon catch against the spring pawls *d*, and rotate the wheels, and when the axle ceases to rotate the momentum of the wheels will still continue them in motion, the spring pawls slipping over the ratchets.

On top of the upright pieces E, is framed a cross piece P, to which is secured a segment rack *g*, into which is forced or held by the spring *h*, the guiding handle Q. The handle Q, is attached to the top of a rod *k*, which passes from thence down below or underneath the platform, and to the lower end of said rod is secured by its middle lever *l*, shown in dotted lines Fig. 2. To each end of the lever *l*, is attached a rod *o*, which extends to the rear of the car, and is there attached to a similarly arranged lever on the "fifth wheel," so that the operator can by means of the handle Q, guide the car as he may desire.

R, are supporting handles, braced and otherwise fastened to the uprights E, for giving support to the operator.

The guiding handle Q, may be more conveniently arranged on top of the cross piece P, and parallel with it, which would bring it in position to be more readily grasped.

Just clear of the ends of the levers is a foot-brake for checking or entirely stopping the car, which is arranged as follows: A foot piece *s*, is attached to the top of a rod *r*, and to the bottom of said rod is fastened a cord *x*, which passes over a friction roller T, and is secured to the arms *p*, *p*, of the bar *q*. Between the brake bar and a stop *t*, on the beam H, which supports the several parts, is placed an elliptic or other spring, which as the brake bar is drawn up by the weight of the operator on the foot piece, so as to apply the brakes, compresses the spring, and when the foot piece is released the said spring carries back the brakes clear of the wheels and raises up the foot piece in position to be again applied.

The foot-car here represented is intended for plank or common roads, but by placing flanges on the wheels they are equally applicable for rail roads, in which latter case the axles should be of the same length, and the guiding apparatus and swiveling of the rear axle may be omitted, as the rails would then become the guides.

The operation is as follows: The weight of the passenger is applied on the levers, which unwinds the bands and revolves the drums, the pawls of which catch into the ratchets on the axle, giving it a rotary motion, which motion of the axle is always in the same direction, although it may be intermittent, causes the ratchets upon is ends to catch against or into the spring pawls in the hubs of the wheels, and imparts to them its motion. When the axle ceases to rotate momentarily while the levers are rising, the wheels will continue to run by their momentum, the spring pawls slipping over the ratchets. Thus the wheels are fast or loose on the axle as the power to drive them may be applied or taken off. As the drums revolve in driving the axle, they wind up the springs, which in turn, when the weight is removed from the levers, uncoil and run the drums back, winding up the bands, and raising up the levers, the spring pawls in this operation slipping over the ratchets.

Having thus fully described my invention, what I claim in the construction of foot-cars as new and desire to secure by Letters Patent is—

1. Suspending each of the treadles upon which the passenger operates, from the same side of the axle, the treadles being so arranged as to rotate the axle, whether they be applied both together, or one at a time alternately, and through said axle give motion to the driving wheels substantially as herein described.

2. I also claim combining with the axle and driving wheels the fixed ratchets and spring pawls, for the purpose of giving the driving wheels a continuous motion in one direction, while the axle may have an intermittent motion in the same direction, as herein represented and described.

NEHEMIAH HODGE.

Witnesses:
N. S. BABBITT,
ABEL WETHERBEE.